(12) United States Patent
Wu et al.

(10) Patent No.: US 11,606,531 B2
(45) Date of Patent: Mar. 14, 2023

(54) IMAGE CAPTURING METHOD, APPARATUS, AND STORAGE MEDIUM

(71) Applicant: BEIJING XIAOMI MOBILE SOFTWARE CO., LTD., Beijing (CN)

(72) Inventors: Xiaojun Wu, Beijing (CN); Daming Xing, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 16/923,719

(22) Filed: Jul. 8, 2020

(65) Prior Publication Data

US 2021/0258535 A1    Aug. 19, 2021

(30) Foreign Application Priority Data

Feb. 19, 2020    (CN) .......................... 202010101946.2

(51) Int. Cl.
| | |
|---|---|
| *H04N 5/91* | (2006.01) |
| *G06T 7/50* | (2017.01) |
| *G06T 19/00* | (2011.01) |
| *H04N 5/232* | (2006.01) |
| *G06V 20/20* | (2022.01) |
| *H04N 1/32* | (2006.01) |
| *H04N 5/265* | (2006.01) |

(52) U.S. Cl.
CPC ............... *H04N 5/91* (2013.01); *G06T 7/50* (2017.01); *G06T 19/006* (2013.01); *H04N 5/232935* (2018.08); *G06T 2207/10016* (2013.01)

(58) Field of Classification Search
CPC .. H04N 5/91; H04N 5/232935; G06T 19/006; G06T 7/50; G06T 2207/10016
See application file for complete search history.

(56) References Cited

U.S. PATENT DOCUMENTS

| | | | |
|---|---|---|---|
| 11,030,814 B1* | 6/2021 | Kwiatkowski | ........ G06T 19/006 |
| 2007/0293265 A1 | 12/2007 | Fei et al. | |
| 2012/0188396 A1* | 7/2012 | Kim | ..................... G11B 27/034 |
| | | | 348/222.1 |
| 2012/0236119 A1 | 9/2012 | Rhee | |

(Continued)

FOREIGN PATENT DOCUMENTS

| | | |
|---|---|---|
| CN | 101473294 A | 7/2009 |
| CN | 105830062 A | 8/2016 |

(Continued)

OTHER PUBLICATIONS

Machine translation of KR20140057817, date published May 14, 2014. (Year: 2014).*

(Continued)

*Primary Examiner* — Sing-Wai Wu
(74) *Attorney, Agent, or Firm* — Syncoda LLC; Feng Ma (57) ABSTRACT

A method and an apparatus for image capturing, and a storage medium can be applied to a terminal device. When it is determined that the terminal is in an augmented reality image capturing scene, augmented reality environment information of the augmented reality image capturing scene is determined. When an image capturing instruction is received, an image is captured and augmented reality environment information corresponding to the image is recorded to obtain a target image carrying the augmented reality environment information.

14 Claims, 6 Drawing Sheets

(56) References Cited

U.S. PATENT DOCUMENTS

| | | | |
|---|---|---|---|
| 2014/0104455 A1 | 4/2014 | Lee | |
| 2015/0178320 A1 | 6/2015 | Gao et al. | |
| 2016/0065860 A1 | 3/2016 | Kamhi et al. | |
| 2019/0342240 A1* | 11/2019 | Garrido | H04M 1/72439 |
| 2020/0051334 A1 | 2/2020 | Leung et al. | |
| 2020/0066045 A1* | 2/2020 | Stahl | G06Q 50/01 |
| 2022/0132095 A1* | 4/2022 | Leung | H04N 13/271 |

FOREIGN PATENT DOCUMENTS

| | | | | |
|---|---|---|---|---|
| WO | WO-2019039194 A1 * | 2/2019 | | H04N 21/431 |
| WO | 2019159620 A1 | 8/2019 | | |

OTHER PUBLICATIONS

Machine translation of WO2019039194, date published Feb. 28, 2019. (Year: 2019).*
OA for EP application 20188337.8, mailed on Oct. 29, 2020.
OA for CN application 202010101946.2, mailed on Mar. 18, 2022.
OA for EP application 20188337.8, mailed on Apr. 7, 2022.

* cited by examiner

Graffiti　　Text　　Enhanceme　Photo frame　Mosaic　　AR

Cancel　　　　　　　　　　　　　　　　　　　Save

IMAGE CAPTURING METHOD, APPARATUS, AND STORAGE MEDIUM

CROSS-REFERENCE TO RELATED APPLICATIONS

This application claims priority to Chinese Patent Application No. 202010101946.2, filed on Feb. 19, 2020, the disclosure of which is hereby incorporated by reference in its entirety.

BACKGROUND

Augmented Reality (AR) technology is to increase a perception of a user to the real world through information provided by a computer system, apply virtual information to the real world, and superimpose virtual objects, scenes, or systematic prompt information generated by the computer system to a real scene, to augment the reality.

SUMMARY

The present disclosure generally relates to the field of augmented reality technology, and more specifically, to an image capturing method, apparatus, and storage medium.

According to embodiments of the present disclosure, there is provided a method for image capturing, applicable to a terminal device. The method can include: in response to determining that the terminal in an augmented reality image capturing scene, augmented reality environment information of the augmented reality image capturing is determined. In response to receiving an image capturing instruction, an image is captured and the augmented reality environment information corresponding to the image is recorded to obtain a target image carrying the augmented reality environment information.

According to the present disclosure, there is provided a device for image capturing, including a memory and a processor. The memory is configured to store instructions. The processor is configured to call the instructions to execute the method for image capturing according to the first aspect or of any example of the first aspect.

According to the present disclosure, there is provided a non-transitory computer-readable storage medium, having computer-executable instructions stored thereon. When the instructions are executed by the processor, a method for image capturing according to the first aspect or of any example of the first aspect is executed.

It is to be understood that both the foregoing general description and the following detailed description are exemplary and explanatory only and are not restrictive of the present disclosure.

BRIEF DESCRIPTION OF THE DRAWINGS

The accompanying drawings, which are incorporated in and form a part of the disclosure, illustrate embodiments of the present disclosure and serve to explain principles of the present disclosure together with the specification.

DETAILED DESCRIPTION

Reference will now be made in detail to example embodiments, examples of which are illustrated in the accompanying drawings. The following description refers to the accompanying drawings in which the same numbers in different drawings represent the same or similar elements unless otherwise represented. The implementations set forth in the following description of example embodiments do not represent all implementations consistent with the present disclosure. Instead, they are merely examples of apparatuses and methods consistent with aspects related to the present disclosure as recited in the appended claims.

Users may not be satisfied with taking a photo of the real scene, but may want to merge virtual contents into their photos to achieve the augmented reality and make the photos look more beautiful or attractive. Augmented reality technologies can meet requirements of the users by overlaying augmented content, such as the virtual content, onto the image captured by the camera to obtain an AR image.

To overlay the virtual content onto the shot image, an image capturing application may have to be enabled. In addition, in the AR image generated by overlaying the virtual content onto the captured image, the AR effect realized by the virtual content is often fixed with pixels of the image, which cannot be modified or edited.

Various embodiments of the present disclosure can provide a method for image capturing, which can modify and edit the AR effect of the captured image without enabling the image capturing application.

Various embodiments of the present disclosure can be applied to an application scene of image capturing by using a camera provided on a terminal. In the example embodiments described below, the terminal may also be referred to as a smart terminal device. The terminal may be a mobile terminal, such as user equipment (UE), a mobile station (MS), etc. The terminal is a device that provides voice and/or data connection to the user, or a chip disposed within the device; for example, a handheld device, a vehicle-mounted device, etc., with wireless connectivity. Examples of the terminal may include a mobile phone, a tablet computer, a notebook computer, a palm computer, a mobile Internet device (MID), a wearable device, a virtual reality (VR) device, an augmented reality (AR) device, a wireless terminal in a field of industrial control, a wireless terminal in a field of unmanned driving, a wireless terminal in a field of remote surgery, a wireless terminal in a smart grid, a wireless terminal in a field of transportation safety, a wireless terminal in a smart city, a wireless terminal in a smart home, etc.

Figure 1:
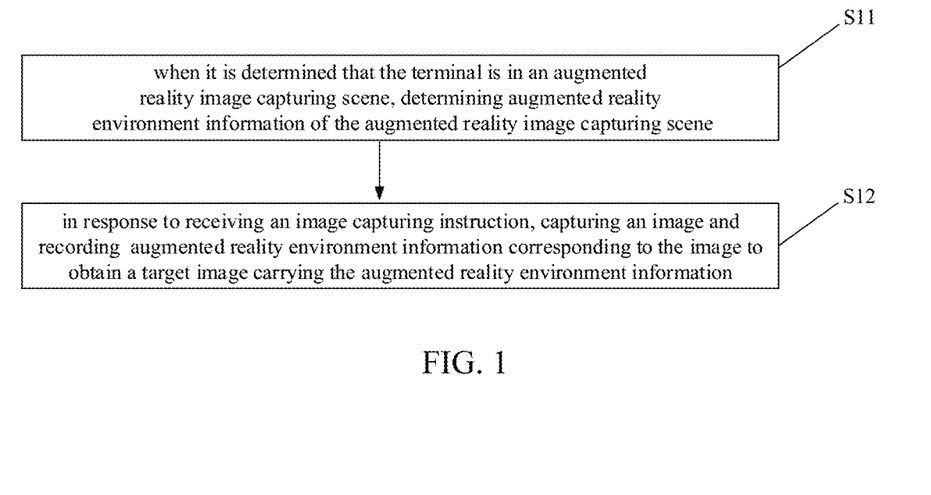
FIG. 1 is a flowchart illustrating a method for image capturing according to some embodiments.

FIG. 1 is a flowchart illustrating a method for image capturing according to some embodiments. As illustrated in FIG. 1, the method is applied in a terminal and includes the following.

In block S11, it is determined that the terminal is in the augmented reality (AR) image capturing scene, and the augmented reality environment information of the augmented reality image capturing scene is determined.

In the present disclosure, for example, when an instruction for enabling an AR image capturing mode is received, the AR image capturing mode of the image capturing apparatus is enabled, to determine that the terminal is in the AR image capturing scene.

In order to establish robust AR environment information of the AR image capturing scene, the environment information of the image capturing scene may be scanned by the image capturing apparatus. The robust AR environment information of the image capturing scene may be obtained after the image capturing apparatus scans the environment information of the image capturing scene. The AR environment information scanned by the image capturing apparatus may be, for example, one or more of plane information, light source information, and environment depth information of the image capturing scene.

The plane information of the image capturing scene may include, for example, the number of planes, position and size of each plane, etc. The light source information of the image capturing scene may include, for example, the number of light sources, the position of the light source, and the like. The environment depth information may be, for example, three-dimensional positions and sizes of the image capturing environment.

Figure 2:
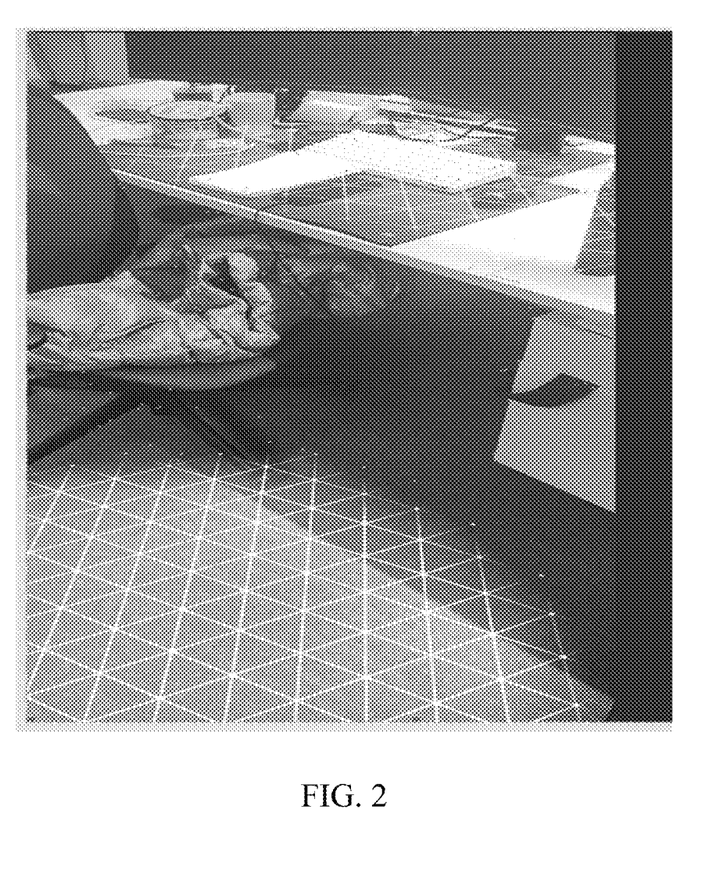
FIG. 2 is a semantic diagram illustrating AR environmental information according to some embodiments.

FIG. 2 is a schematic diagram illustrating the scanning of the environment information of the image capturing scene by the image capturing apparatus to obtain the robust AR environment information of the image capturing scene according to some embodiments.

As illustrated in FIG. 2, after the environment information of the image capturing scene is scanned by the image capturing apparatus, available plane information may include the position and size of a plane region of the ground having grid lines that are interlaced to each other and the position and size of a plane region of a desktop having grid lines that are interlaced with each other. In addition, after the environment information of the image capturing scene is scanned by the image capturing apparatus, the environment depth information is obtained, including information of three-dimensional positions and sizes of the image capturing environment generated from discrete points marked in an image and the plane information.

In block S12, when an image capturing instruction is received, an image is captured and the augmented reality environment information corresponding to the image is recorded to obtain a target image carrying the augmented reality environment information.

In some embodiments of the present disclosure, after the robust AR environment information is established based on the AR image capturing scene, the image may be captured according to the received image capturing instruction and the AR environment information corresponding to the image may be recorded, to obtain the image carrying the AR environment information.

In some embodiments, it is determined that the terminal is in the AR image capturing scene, and the AR environment information of the AR image capturing scene is determined. When the image capturing instruction is received, the image is captured and the AR environment information corresponding to the image is recorded to obtain the image carrying the AR environment information. In addition, according to the AR environment information carried in the captured image, modification and edition of the AR effect on the captured image may be realized without enabling the image capturing application.

In some embodiments of the present disclosure, the received image capturing instruction may be an instruction for capturing the image or an instruction for capturing a video. The present disclosure will be described in detail below with reference to practical applications, in which a case for capturing a picture based on the image capturing instruction and a case for capturing a video based on the image capturing instruction may be described respectively.

The present disclosure will be described in detail below with respect to a case that the picture is captured by applying the method according to the present disclosure.

Figure 3:
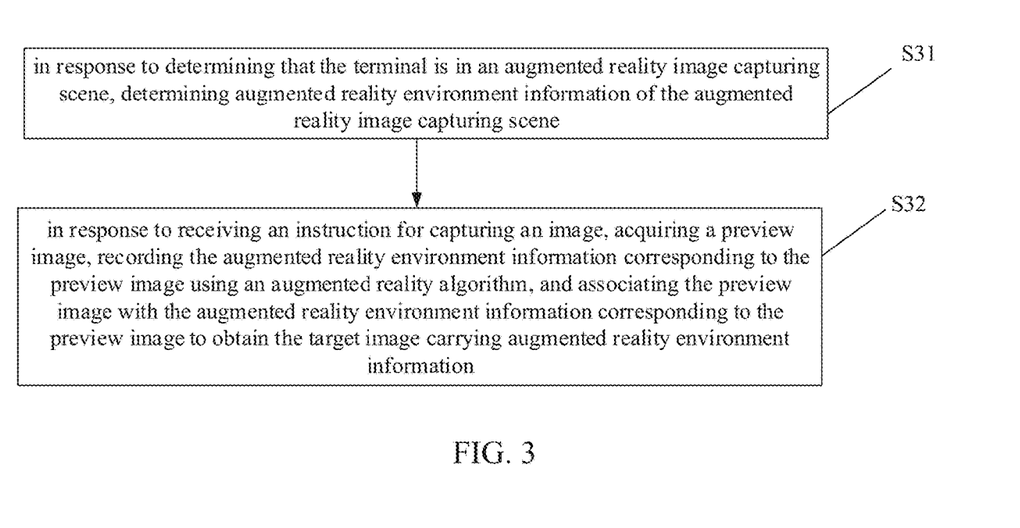
FIG. 3 is a flowchart illustrating a method for image capturing according to some embodiments.

FIG. 3 is a flowchart illustrating a method for image capturing according to some embodiments. As illustrated in FIG. 3, the method is applicable in the terminal and may include blocks S31 and S32. The block S31 is similar to the block S11 of FIG. 1, which is not elaborated here.

In block S32, when the instruction for capturing a picture is received, a preview image is acquired, and the augmented reality environment information for generating the preview image is recorded using an augmented reality algorithm. The preview image is associated with the augmented reality environment information for generating the preview image to obtain the target image carrying the augmented reality environment information.

In some embodiments of the present disclosure, in order to prevent the case that the recorded AR environment information is inaccurate due to a size inconsistency between the preview image and a captured image, the present disclosure may set in advance a same field of view (FOV) for acquiring the preview image and for capturing the image. Therefore, when the instruction for capturing the picture is received, the FOV for acquiring the preview image and the FOV for capturing the image are always consistent with each other. Therefore, the accuracy of the recorded AR environment information of the target image should be improved.

In an implementation, after the AR environment information for acquiring each preview image is recorded using the AR algorithm, each preview image may be associated with the AR environment information for acquiring the preview image to obtain the target image carrying the AR environment information.

After the AR environment information for acquiring each preview image is recorded using the AR algorithm, each preview image may be associated with one or more pieces of AR environment information for acquiring the respective preview image in a form of key-value pair.

For example, the AR environment information of the image includes the plane information, the light source information, and the environment depth information of the image. After the AR environment information of each preview image is recorded using the AR algorithm, the preview image is associated with the plane information of the preview image, the light source information of the preview image and the environment depth information of the preview image in the form of key-value pair, such that the preview image and several pieces of AR environment information of the preview image form a set of AR environment information.

In some embodiments, by determining that the terminal is in the AR image capturing scene, the AR environment information of the AR image capturing scene is determined. When the instruction for capturing a picture is received, the AR environment information for acquiring each preview image is recorded using the AR algorithm, and each preview image is associated with the AR environment information for acquiring the respective preview image to obtain the target image carrying the AR environment information. Therefore, according to the AR environment information carried in the target image, modification and edition on the AR effect of the target image may be implemented, thereby enriching an application scene of AR.

Figure 4:
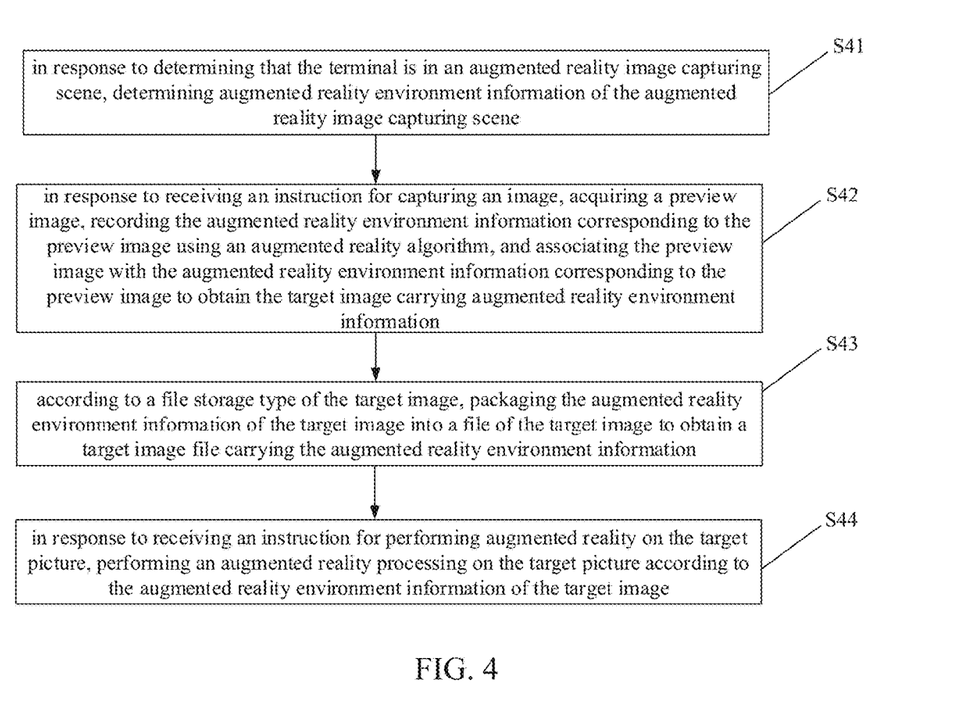
FIG. 4 is a flowchart illustrating a method for image capturing according to some embodiments.

FIG. 4 is a flowchart illustrating a method for image capturing according to some embodiments. As illustrated in FIG. 4, the method is applicable to a terminal and may include blocks S41, S42, S43, and S44. The blocks S41 and S42 are similar to the blocks S31 and S32 of FIG. 3, which are not elaborated here.

In block S43, according to a file storage type of the target image, the augmented reality environment information corresponding to the target image is packaged into a file of the target image to obtain a target picture carrying the augmented reality environment information.

In some embodiments of the present disclosure, according to the file storage type of the target image, the AR environment information corresponding to the target image may be packaged into the file of the target image to obtain the target picture carrying the AR environment information.

For example, the file storage type of the target image is a JPEG format. A length of several AR environment information, i.e., a set of AR environment information, of the target image is written into metadata (such as xmp) of image file of the JPEG format and the set of AR environment information of the target image is attached to the end of the image file of the JPEG format.

As another example, the file storage type of the target image is a HEIF format. Since the HEIF format allows customized data to be written into the image file as an independent data block, the data can be customized, and the set of AR environment information of the target image may be written into the image file of the HEIF format as independent data.

In block S44, when an instruction for performing augmented reality on the target picture is received, an augmented reality processing is performed on the target picture according to the augmented reality environment information of the target picture.

In some embodiments of the present disclosure, the instruction for performing the AR on the target picture may be generated based on the user's selection on AR processing instructions when the image is edited by the user. The instruction for performing the AR on the target picture may include overlapping an AR image onto the target picture, replacing the AR effect of the target picture, and overlaying a sound effect on the target picture, but the present disclosure is not limited thereto.

In an implementation, after the augmented reality environment information corresponding to the target image is packaged into the file of the target image based on the file storage type of the target image to obtain the target picture carrying the augmented reality environment information, and when the instruction for performing the AR on the target picture is received, the target image is decoded to obtain the AR environment information of the target picture. The AR is performed on the target picture based on the AR environment information of the target picture and a preset AR processing manner.

For example, the file storage type of the target image is the JPEG format. The length of the several AR environment information, i.e., the set of AR environment information, of the image picture is written into the metadata (e.g. xmp) of the image file of the JPEG format, and the data of the set of AR environment information of the target image is attached to the end of the image file of the JPEG format. After an instruction for overlapping an AR image onto the target picture is received, the target picture is decoded. In decoding the target picture, in addition to generally decoding the image file of the JPEG format, the data of the set of AR environment information of the target picture at the end of the image file of the JPEG format is decoded. Since the beginning and the length of the set of AR environment information are recorded in a header of the image file of the JPEG format when the image file is generated and it is unaware of the set of AR environment information of the target picture attached to the end of the image file, it requires to obtain the length from the metadata, such as xmp, through decoding, such that the image file is decoded from a position of the set of AR environment information that is calculated based on the length starting from an end point of the image file, to obtain the set of AR environment information of the target picture. The AR processing is performed on the target picture based on the AR environment information of the target picture and the instruction for performing the AR on the target picture.

Figure 5:
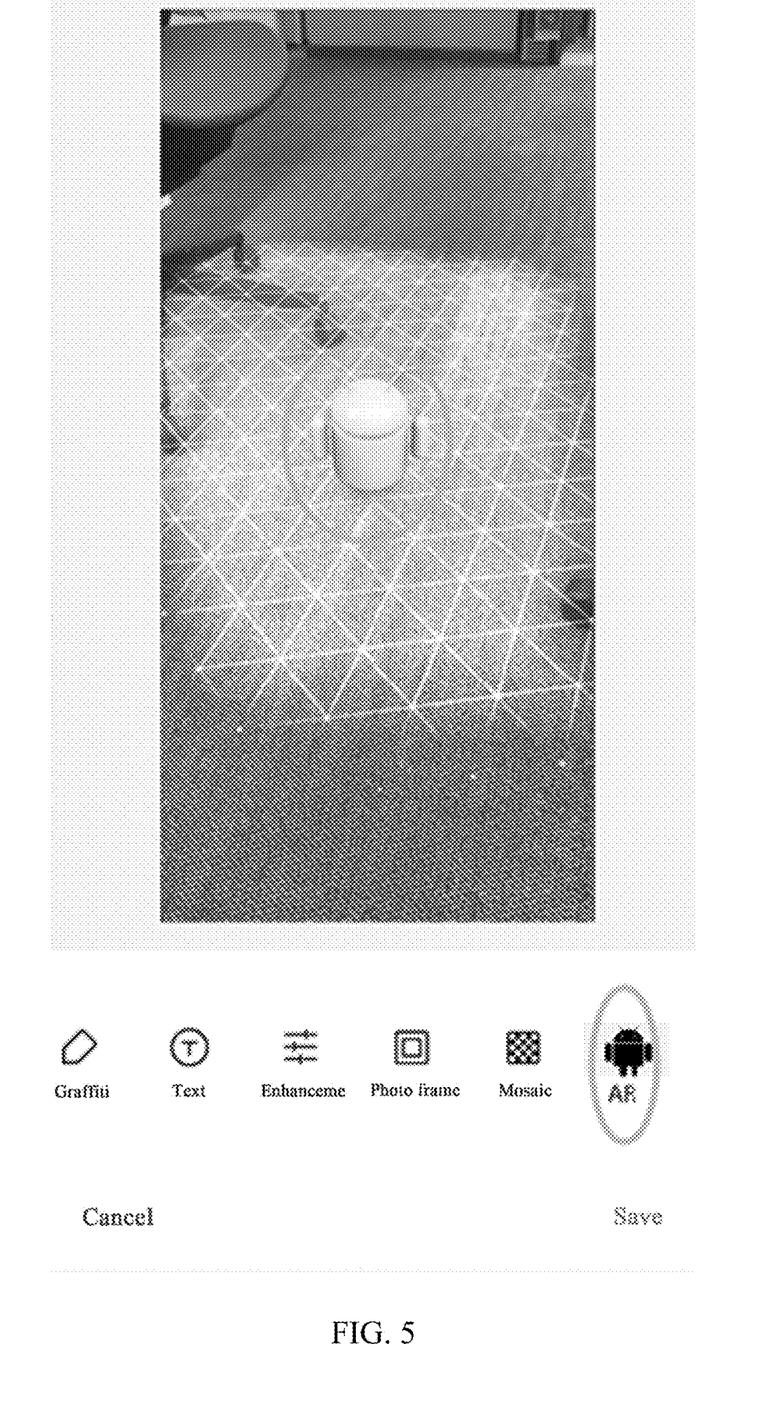
FIG. 5 is a schematic diagram illustrating performing an augmented reality operation on a target picture some embodiments.

FIG. 5 is a schematic diagram illustrating the augmented reality processing on the target picture according to the instruction from some embodiments.

In FIG. 5, when the instruction for performing the augmented reality processing on the target picture is received, for example after triggering the touch key "AR" as illustrated in FIG. 5, the AR image may be overlapped onto the target image within the region formed by the grid lines of the AR plane based on the AR environment information of the picture.

In some embodiments, after the AR environment information of the target image is packaged into the file of the target image based on the file storage type of the target image to obtain the target picture carrying the AR environment information, and when the instruction for performing the AR on the target picture is received, the AR processing may be performed on the target picture based on the AR environment information of the target picture, thereby allowing the target picture to be re-edited secondarily, enriching the application scene of AR, and improving user experience.

The present disclosure will be described in detail below with respect to the case that the video is captured by applying the method according to the present disclosure.

Figure 6:
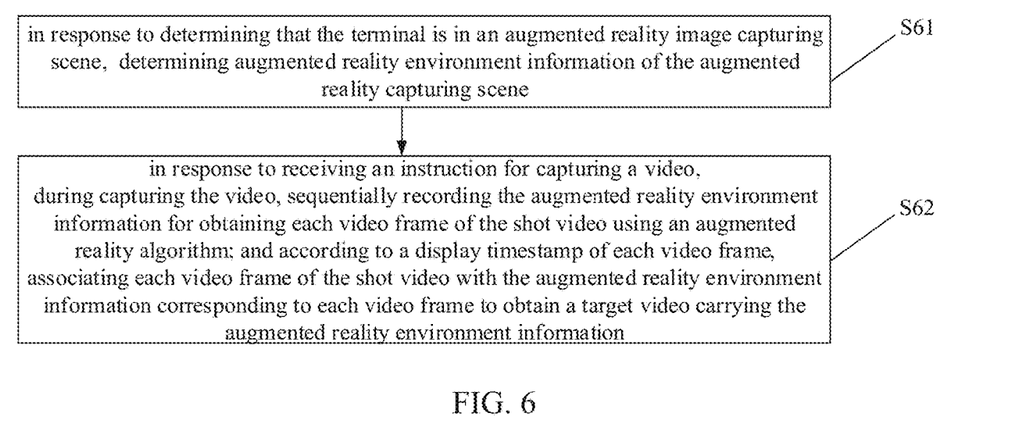
FIG. 6 is a flowchart illustrating a method for image capturing according to some embodiments.

FIG. 6 is a flowchart illustrating a method for image capturing according to some embodiments. As illustrated in FIG. 6, the method may be applicable to a terminal and may include blocks S61 and S62. The block S61 is similar to the block S11 of FIG. 1, which is not elaborated here.

In block S62, when the instruction for image capturing a video is received, during image capturing the video, the augmented reality environment information corresponding to each video frame of the shot video is sequentially recorded using the augmented reality algorithm. Based on a display timestamp of each video frame, each video frame of the shot video is associated with the augmented reality environment information corresponding to respective video frame, to obtain a target video carrying the augmented reality environment information.

In some embodiments of the present disclosure, when the instruction for image capturing a video is received, during image capturing the video, the augmented reality environment information corresponding to each video frame of the shot video is recorded in sequence according to the time sequence of the shot video.

After the augmented reality environment information corresponding to each video frame of the shot video is obtained, each video frame may be associated with one or more pieces of augmented reality environment information of respective video frame in a form of key-value pair, such that the video frame and several AR environment information of the video frame form a set of environment information in various dimensions.

According to the display timestamp of each video frame, each video frame of the shot video is associated with the set of several AR environment information of the respective video frame to obtain the target video carrying the augmented reality environment information.

In some embodiments of the present disclosure, the augmented reality environment information of the augmented reality image capturing scene is determined by determining that the terminal is in the augmented reality image capturing scene. When the instruction for capturing a video is received, the augmented reality environment information corresponding to each video frame of the shot video is recorded using the augmented reality algorithm. Based on a display timestamp of each video frame, each video frame of the shot video is associated with the augmented reality environment information corresponding to the respective video frame to obtain the target video carrying the augmented reality environment information. Therefore, according to the augmented reality environment information carried in the target video, modification and edition on the AR effect of the target video may be implemented.

Figure 7:
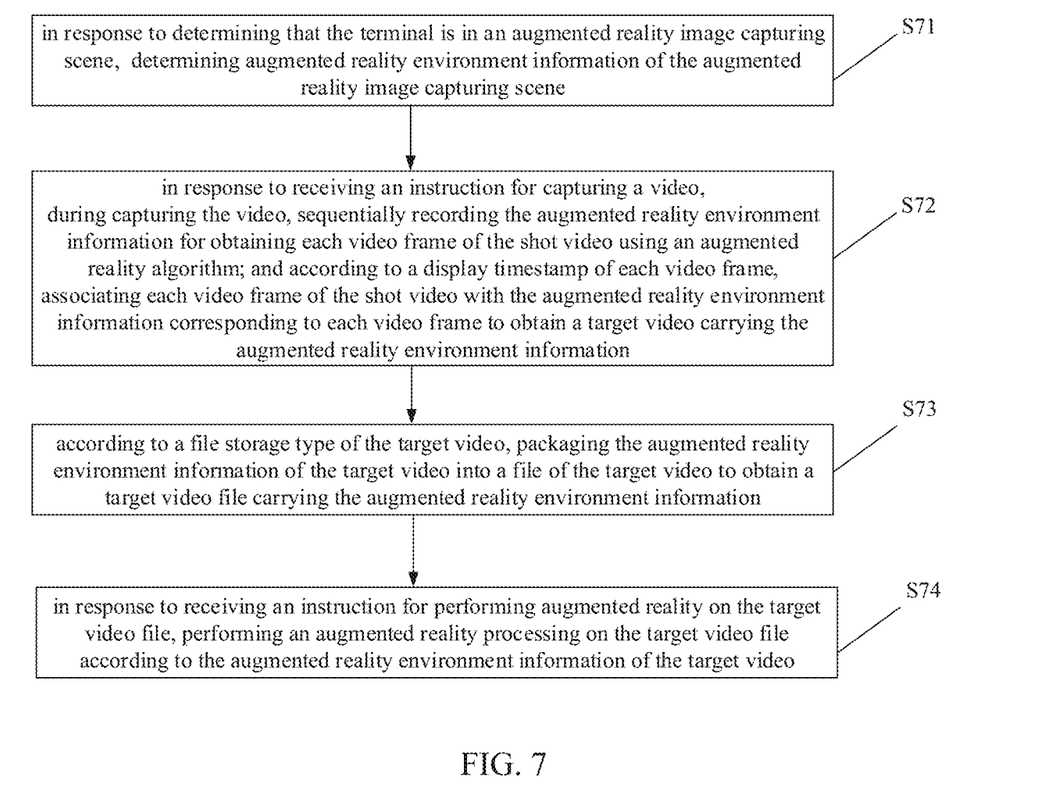
FIG. 7 is a flowchart illustrating a method for image capturing according to some embodiments.

FIG. 7 is a flowchart illustrating a method for image capturing with augmented reality according to some embodiments. As illustrated in FIG. 7, the method may be applicable to a terminal and may include blocks S71, S72, S73, and S74. The blocks S71 and S72 are similar to the blocks S61 and S62 of FIG. 6, which are not elaborated here.

In block S73, according to the file storage type of the target video, the augmented reality environment information for capturing the target video is packaged into the file of the target video to obtain a target video file carrying the augmented reality environment information.

In some embodiments of the present disclosure, based on the file storage type of the target video, the AR environment information of the target video may be packaged into the file of the target video to obtain the target video file carrying the AR environment information.

For example, the file storage type of the target video is a mkv format. The mkv format allows to customize data structure. For example, a multi-track video file and a multi-caption video file may be customized in the video file of the mkv format. A video track that is displayed over time may be generated from a "frame," i.e., the AR environment information of each frame (that is, the set of the AR environment information), together with the display timestamp corresponding to this frame, and may be written into the video file of the mkv format.

In block S74, when an instruction for performing augmented reality on the target video file is received, the augmented reality processing is performed on the target video file according to the augmented reality environment information of the target video.

In some embodiments of the present disclosure, for example, the instruction for performing the AR on the target video file may be received based on the user's selection on the AR processing instructions when the user edits the video.

The instruction for performing AR on the target video file may include overlapping an AR image onto the target video file, replacing the AR image of the target video file, overlapping a sound effect onto the target video file.

In an implementation, after the AR environment information of the target video is packaged into the file of the target video according to the file storage type of the target video, to obtain the target video file carrying the augmented reality environment information, and when the instruction for performing the AR on the target video file is received, the AR processing may be performed on the target video file based on the AR environment information of the target video file and a preset AR processing manner.

For example, when an instruction for overlapping the AR sound effect onto the target video file is received, target video file is received, the AR sound effect is overlaid onto the target video file based on the AR environment information of the target video and a preset AR sound effect.

In examples of the present disclosure, after the AR environment information of the target video is packaged into the file of the target video based on the file storage type of the target video, to obtain the target video file carrying the AR environment information and when the instruction for performing AR on the target video file is received, the AR processing may be performed on the target video file according to the AR environment information of the target video file, thereby allowing the target video to be re-edited and improving user experience.

Based on the same inventive concept, the present disclosure further provides an apparatus for image capturing with augmented reality.

It may be understood that, in order to implement the above functions, the apparatus provided in embodiments of the present disclosure may include a hardware structure and/or a software module for performing each function. Embodiments of the present disclosure can be implemented in hardware or a combination of hardware and computer software, in combination with the exemplary elements and algorithm steps disclosed in the disclosed embodiments. Whether to perform the function in hardware or by hardware driven by the computer software depends upon the particular application and design constraints of the solution. Those ordinary in the art may implement the described functions in varying ways depending on each particular application, but such implementations should not be interpreted as a departure from the scope of the embodiments of the present disclosure.

Figure 8:
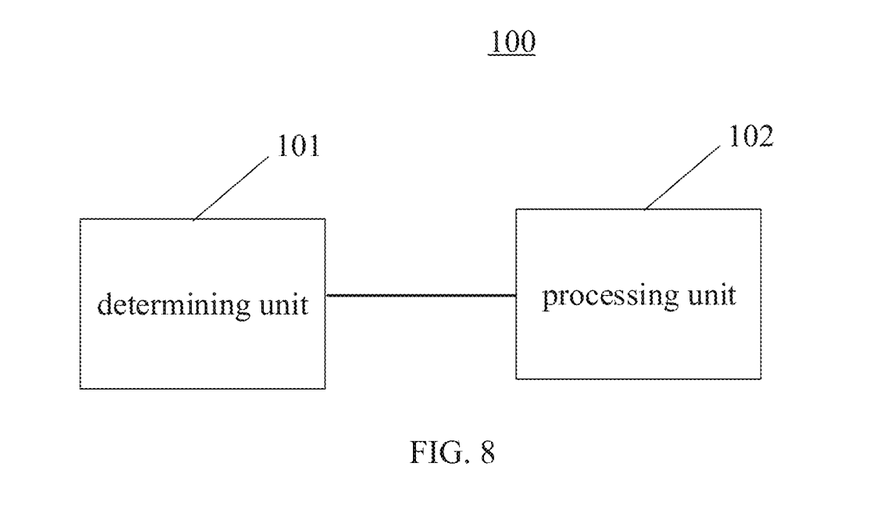
FIG. 8 is a block diagram illustrating an apparatus for image capturing according to some embodiments.

FIG. 8 is a block diagram illustrating an apparatus for image capturing according to some embodiments. As illustrated in FIG. 8, the apparatus may include a determining unit 101 and a processing unit 102.

The determining unit 101 may be configured to, in response to determining that the terminal is in the augmented reality image capturing scene, determine augmented reality environment information of the augmented reality image capturing scene;

The processing unit 102 may be configured to, in response to receiving an image capturing instruction, capture an image and record the augmented reality environment information corresponding to the image to obtain a target image carrying the augmented reality environment information.

In some embodiments, the augmented reality environment information may include one or more of plane information, light source information, and environment depth information of the image capturing scene.

In some embodiments, the image capturing instruction is an instruction for capturing an image. The processing unit 102 is configured to capture the image and record the augmented reality environment information corresponding to the image to obtain the target image carrying the augmented reality environment information by the following. A preview image is acquired. The augmented reality environment information corresponding to the preview image is recorded using an augmented reality algorithm. Each preview image is associated with the augmented reality environment information of the respective preview image, to obtain the target image carrying the augmented reality environment information.

In some embodiments, the image capturing instruction is an instruction for image capturing a video. The processing unit 102 is configured to capture the image and record the augmented reality environment information corresponding to the image to obtain the target image carrying the augmented reality environment information by the following. When capturing the video, the augmented reality environment information of each video frame of the shot video is sequentially recorded using the augmented reality algorithm. Based on display timestamp of each video frame, each video frame of the shot video is associated with the augmented reality environment information of the respective video frame to obtain the target video carrying the augmented reality environment information.

In some embodiments, the processing unit 102 is further configured to, based on the file storage type of the target image, package the augmented reality environment information of the target image into the file of the target image to obtain the target picture carrying the augmented reality environment information. In addition, the processing unit 102 is further configured to, when receiving an instruction for performing augmented reality on the target picture, perform the augmented reality processing on the target picture according to the augmented reality environment information of the target picture.

In some embodiments, the processing unit 102 is further configured to, package the augmented reality environment information of the target video into the file of the target video based on the file storage type of the target video, to obtain the target video file carrying the augmented reality environment information. In addition, the processing unit 102 is further configured to, when receiving an instruction for performing augmented reality on the target video file, perform the augmented reality processing on the target video file according to the augmented reality environment information of the target video file.

With regard to the apparatus in the above embodiment, the specific mode in which each module performs the operation has been described in detail in the embodiments related to the method, and will not be described in detail here.

Figure 9:
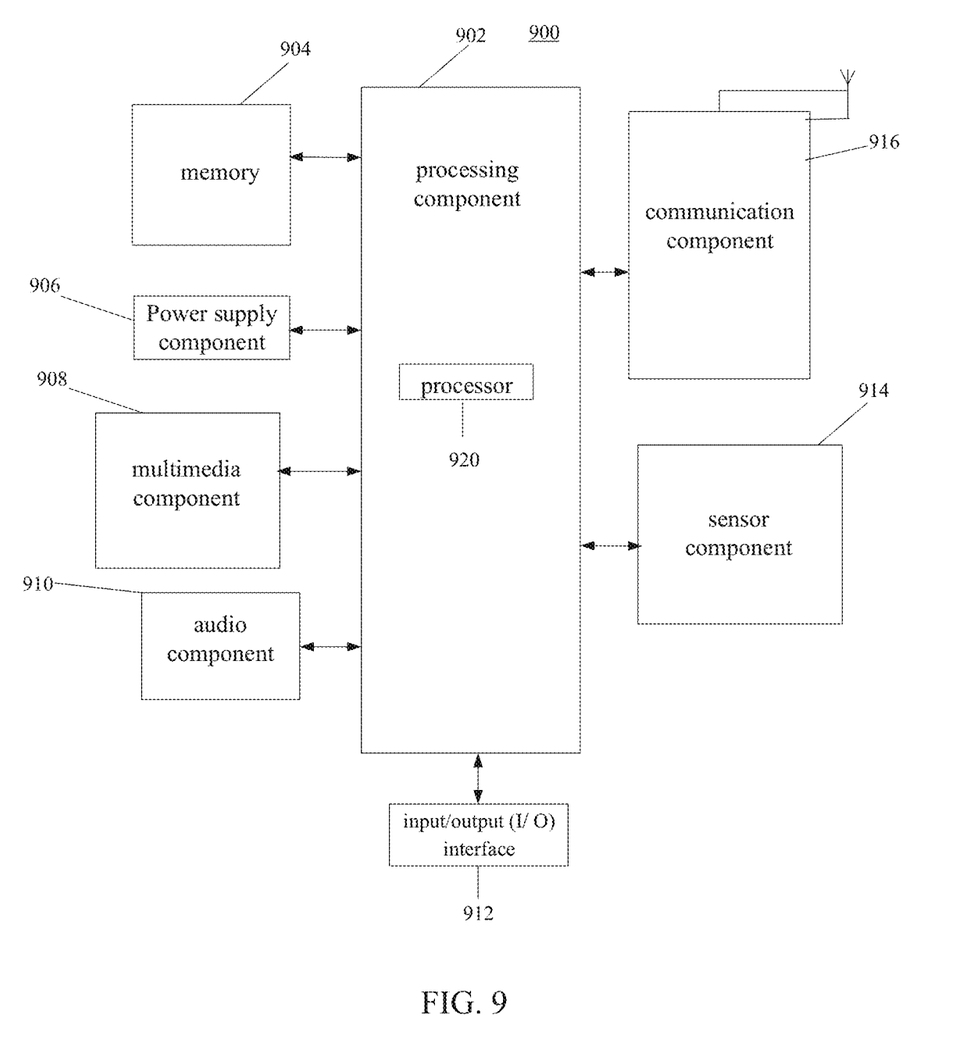
FIG. 9 is a block diagram illustrating a device according to some embodiments.

FIG. 9 is a block diagram illustrating an apparatus 900 for image capturing according to some embodiments. For example, the apparatus 900 may be a mobile phone, a computer, a digital broadcast terminal, a messaging device, a game console, a tablet device, a medical device, an exercise device, a personal digital assistant, and the like.

As illustrated in FIG. 9, the apparatus 900 may include one or more of following components: a processing component 902, a component memory 904, a power supply component 906, a multimedia component 908, an audio component 910, an input/output (I/O) interface 912, a sensor component 914, and a communication component 916.

The processing component 902 generally controls the overall operation of the apparatus 900, such as operations associated with a display, telephone calls, data communications, camera operations, and recording operations. Further, the processing component 902 may include one or more processors 920 to execute instructions to perform all or part of the steps of the method described above. Further, the processing component 902 may include one or more modules to facilitate processing of interactions between processing component 902 and other components. For example, the processing component 902 may include a multimedia module to facilitate the interaction between the multimedia component 908 and the processing component 902.

The memory 904 is configured to store various types of data to support operations of the apparatus 900. Examples of such data include instructions for any application or method operating on the apparatus 900, contact data, phonebook data, messages, pictures, videos, and the like. The memory 904 may be implemented by any type of volatile or non-volatile storage device or a combination thereof, such as s static random access memory (SRAM), an electrically erasable programmable read only memory (EEPROM), an erasable programmable read only memory (EPROM), a programmable read only memory (PROM), a read only memory (ROM), a magnetic memory, a flash memory, a disk or CD-ROM.

The power supply component 906 provides power to various components of the apparatus 900. The power supply component 906 may include a power management system, one or more power supplies, and other components associated with generating, managing, and distributing power supplies for the apparatus 900.

The multimedia component 908 includes a screen providing an output interface between the apparatus 900 and the user. In some embodiments, the screen may include a liquid crystal display (LCD) and a touch panel (TP). In some embodiments, an organic light-emitting diode (OLED) display can be employed.

If the screen includes the TP, the screen may be implemented as a touch screen to receive input signals from the user. The TP includes one or more touch sensors to sense touch, swipe, and gestures on the TP. The touch sensor may not only sense the boundary of a touch or sliding motion, but also detect the duration and pressure related to the touch or slide operation. In some embodiments, the multimedia component 908 includes a front camera and/or a rear camera. When the apparatus 900 is in an operation mode, such as an image capturing mode or a video mode, the front camera and/or the rear camera may receive external multimedia data. Each front camera and rear camera may be a fixed optical lens system or have a focal length and an optical zoom capability.

The audio component 910 is configured to output and/or input audio signals. For example, the audio component 910 includes a microphone (MIC). When the apparatus 900 is in the operation mode, such as a call mode, a record mode, and a voice recognition mode, the MIC is configured to receive external audio signals. The received audio signals may be further stored in the memory 904 or sent via the communication component 916. In some embodiments, the audio component 910 further includes a speaker for outputting audio signals.

The I/O interface 912 provides an interface between the processing component 902 and a peripheral interface module. The peripheral interface module may be a keyboard, a click wheel, a button, and the like. These buttons may include, but are not limited to: a home button, a volume button, a start button, and a lock button.

The sensor component 914 includes one or more sensors, configured to provide various aspects of a state assessment for the apparatus 900. For example, the sensor component 914 may detect an open/closed state of the apparatus 900, and a relative positioning of the components, such as a display and a keypad of the apparatus 900. The sensor component 914 may further detect a change in a position of the apparatus 900 or a component of the apparatus 900, the presence or absence of a contact between the user and the apparatus 900, the position or an acceleration/deceleration of the apparatus 900 and the temperature change of the apparatus 900. The sensor component 914 may include a proximity sensor configured to detect the presence of nearby objects in the absence of any physical contact. The sensor component 914 may further include an optical sensor, such as a CMOS or a CCD image sensor, for use in an imaging application. In some embodiments, the sensor component 914 may also include an acceleration sensor, a gyroscope sensor, a magnetic sensor, a pressure sensor, or a temperature sensor.

The communication component 916 is configured to facilitate a wired or a wireless communication between the apparatus 900 and other devices. The apparatus 900 may access a wireless network based on communication standards, such as WI-FI, 2G, 3G, 4G, 5G, or a combination thereof. In an exemplary embodiment, the communication component 916 receives a broadcast signal or broadcast-related information from an external broadcast management system via a broadcast channel. In some embodiments, the communication component 916 further includes a near field communication (NFC) module to facilitate a short-range communication. For example, an NFC module may be implemented based on a radio frequency identification (RFID) technology, an infrared data association (IrDA) technology, an ultra-wideband (UWB) technology, a Bluetooth (BT) technology and other technologies.

In some embodiments, the apparatus 900 may be implemented by one or more application specific integrated circuits (ASIC), digital signal processors (DSP), digital signal processing equipment (DSPD), programmable logic devices (PLD) and field programmable gate arrays (FPGA), controllers, microcontrollers, microprocessors and other electronic components, and configured to execute the above method.

In some embodiments, a non-temporary computer readable storage medium including instructions is further provided, for example, the memory 904 including instructions. The above instructions may be executed by the processor 920 of the apparatus 900 to complete the above method. For example, the non-temporary computer readable storage medium may be a ROM, a random-access memory (RAM), a CD-ROM, a magnetic tape, a floppy disk, and an optical data storage equipment, and the like.

The various device components, modules, units, blocks, or portions may have modular configurations, or are composed of discrete components, but nonetheless can be referred to as "modules" in general. In other words, the "components," modules," "blocks," "portions," or "units" referred to herein may or may not be in modular forms, and these phrases may be interchangeably used.

In the present disclosure, the terms "installed," "connected," "coupled," "fixed" and the like shall be understood broadly, and can be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

In the description of the present disclosure, the terms "one embodiment," "some embodiments," "example," "specific example," or "some examples," and the like can indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described can be combined in a suitable manner in any one or more embodiments or examples. In addition, various embodiments or examples described in the specification, as well as features of various embodiments or examples, can be combined and reorganized.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more portions of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium can be tangible.

The operations described in this disclosure can be implemented as operations performed by a data processing apparatus on data stored on one or more computer-readable storage devices or received from other sources.

The devices in this disclosure can include special purpose logic circuitry, e.g., an FPGA (field-programmable gate array), or an ASIC (application-specific integrated circuit). The device can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The devices and execution environment can realize various different computing model infrastructures, such as web services, distributed computing, and grid computing infrastructures.

A computer program (also known as a program, software, software application, app, script, or code) can be written in any form of programming language, including compiled or interpreted languages, declarative or procedural languages, and it can be deployed in any form, including as a stand-alone program or as a portion, component, subroutine, object, or other portion suitable for use in a computing environment. A computer program can, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more portions, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA, or an ASIC.

Processors or processing circuits suitable for the execution of a computer program include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented with a computer and/or a display device, e.g., a VR/AR device, a head-mount display (HMD) device, a head-up display (HUD) device, smart eyewear (e.g., glasses), a CRT (cathode-ray tube), LCD (liquid-crystal display), OLED (organic light emitting diode), or any other monitor for displaying information to the user and a keyboard, a pointing device, e.g., a mouse, trackball, etc., or a touch screen, touch pad, etc., by which the user can provide input to the computer.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components.

The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

It should be understood that "a plurality" or "multiple" as referred to herein means two or more. "And/or," describing the association relationship of the associated objects, indicates that there may be three relationships, for example, A and/or B may indicate that there are three cases where A exists separately, A and B exist at the same time, and B exists separately. The character "/" generally indicates that the contextual objects are in an "or" relationship.

In the present disclosure, a first element being "on" a second element may indicate direct contact between the first and second elements, without contact, or indirect geometrical relationship through one or more intermediate media or layers, unless otherwise explicitly stated and defined. Similarly, a first element being "under," "underneath" or "beneath" a second element may indicate direct contact between the first and second elements, without contact, or indirect geometrical relationship through one or more intermediate media or layers, unless otherwise explicitly stated and defined.

Some other embodiments of the present disclosure can be available to those skilled in the art upon consideration of the specification and practice of the various embodiments disclosed herein. The present application is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims.

The invention claimed is:

1. A method for image capturing, applicable to a terminal, the method comprising:
   in response to determining that the terminal is in an augmented reality image capturing scene, determining augmented reality environment information of the augmented reality image capturing scene; and
   in response to receiving an image capturing instruction and the image capturing instruction being an instruction for capturing an image, capturing an image and recording the augmented reality environment information corresponding to the image, to obtain a target image carrying the augmented reality environment information, comprising:
   capturing a preview image;
   recording the augmented reality environment information for acquiring the preview image using an augmented reality algorithm;
   associating the preview image with the augmented reality environment information for acquiring the preview image, to obtain the target image carrying the augmented reality environment information;
   packaging the augmented reality environment information of the target image into a file of the target image in a manner depending on a file storage type of the target image, to obtain a target picture carrying the augmented reality environment information; and
   in response to receiving an instruction for performing augmented reality on the target picture, performing an augmented reality processing on the target picture according to the augmented reality environment information of the target picture;
   wherein packaging the augmented reality environment information comprises:
   writing a length of the augmented reality environment information into XMP metadata of the file and attaching the augmented reality environment information to an end of the file in response to the file storage type is JPEG format;
   wherein performing the augmented reality processing on the target picture comprises:
   in response to the instruction for performing augmented reality on the target picture, obtaining the length of the augmented reality environment information from the XMP metadata,
   obtaining the augmented reality environment information by determining a starting point for the augmented reality environment information based on the length and an end position of the file, and
   performing the augmented reality processing using the augmented reality environment information.

2. The method of claim 1, wherein the augmented reality environment information comprises:
   one or more of plane information, light source information, and environment depth information of an image capturing scene.

3. The method of claim 1, wherein the image capturing instruction is an instruction for capturing a video; and
   capturing the image and recording the augmented reality environment information corresponding to the image, to obtain the target image carrying the augmented reality environment information comprises:
   when capturing the video, sequentially recording the augmented reality environment information corresponding to each video frame of the shot video using an augmented reality algorithm; and
   according to a display timestamp of each video frame, associating each video frame of the shot video with the augmented reality environment information corresponding to each video frame, to obtain a target video carrying the augmented reality environment information.

4. The method of claim 3, further comprising:
   according to a file storage type of the target video, packaging the augmented reality environment information of the target video into a file of the target video to obtain a target video file carrying the augmented reality environment information; and
   in response to receiving an instruction for performing augmented reality on the target video file, performing an augmented reality processing on the target video file according to the augmented reality environment information of the target video file.

5. A mobile terminal implementing the method according to claim 1, wherein the mobile terminal has an image capturing application installed therein, and comprises a display screen configured display the captured image through the image capturing application.

6. The mobile terminal according to claim 5, wherein the mobile terminal is configured to, according to the AR environment information carried in the captured image, enable modification and edition of the AR effect on the captured image without enabling the image capturing application.

7. An apparatus for image capturing, comprising:
   a processor;
   a memory component configured to store instructions executable by the processor;
   wherein the processor is configured to:
   in response to determining that the terminal is in an augmented reality image capturing scene, determine augmented reality environment information of the augmented reality image capturing scene; and in response to receiving an image capturing instruction and the image capturing instruction being an instruction for capturing an image, capture an image and record the augmented reality environment information corresponding to the image, to obtain a target image carrying the augmented reality environment information by:

capturing a preview image;

recording the augmented reality environment information for acquiring the preview image using an augmented reality algorithm;

associating the preview image with the augmented reality environment information for acquiring the preview image, to obtain the target image carrying the augmented reality environment information;

packaging the augmented reality environment information of the target image into a file of the target image in a manner depending on a file storage type of the target image, to obtain a target picture carrying the augmented reality environment information, comprising:

writing a length of the augmented reality environment information into XMP metadata of the file and attaching the augmented reality environment information to an end of the file in response to the file storage type is JPEG format; and in response to receiving an instruction for performing augmented reality on the target picture, performing an augmented reality processing on the target picture according to the augmented reality environment information of the target picture;

wherein the processor is further configured to:

in response to the instruction for performing augmented reality on the target picture, obtain the length of the augmented reality environment information from the XMP metadata, obtain the augmented reality environment information by determining a starting point for the augmented reality environment information based on the length and an end position of the file, and perform the augmented reality processing using the augmented reality environment information.

8. The apparatus of claim 7, wherein the augmented reality environment information comprises:

one or more of plane information, light source information, and environment depth information of an image capturing scene.

9. The apparatus of claim 7, wherein the image capturing instruction is an instruction for capturing a video; and the processor is further configured to:

when capturing the video, sequentially record the augmented reality environment information corresponding to each video frame of the shot video using an augmented reality algorithm; and according to a display timestamp of each video frame, associate each video frame of the shot video with the augmented reality environment information corresponding to each video frame, to obtain a target video carrying the augmented reality environment information.

10. The apparatus of claim 9, wherein the processor is further configured to:

according to a file storage type of the target video, package the augmented reality environment information of the target video into a file of the target video to obtain a target video file carrying the augmented reality environment information; and in response to receiving an instruction for performing augmented reality on the target video file, perform an augmented reality processing on the target video file according to the augmented reality environment information of the target video file.

11. A non-transitory computer-readable storage medium having instructions stored therein, wherein when the instructions are executed by a processor, a method for image capturing is implemented, the method comprising:

in response to determining that the terminal is in an augmented reality image capturing scene, determining augmented reality environment information of the augmented reality image capturing scene; and in response to receiving an image capturing instruction and the image capturing instruction being an instruction for capturing an image, capturing an image and recording the augmented reality environment information corresponding to the image, to obtain a target image carrying the augmented reality environment information, comprising:

capturing a preview image;

recording the augmented reality environment information for acquiring the preview image using an augmented reality algorithm;

associating the preview image with the augmented reality environment information for acquiring the preview image, to obtain the target image carrying the augmented reality environment information;

packaging the augmented reality environment information of the target image into a file of the target image in a manner depending on a file storage type of the target image, to obtain a target picture carrying the augmented reality environment information; and in response to receiving an instruction for performing augmented reality on the target picture, performing an augmented reality processing on the target picture according to the augmented reality environment information of the target picture;

wherein packaging the augmented reality environment information comprises:

writing a length of the augmented reality environment information into XMP metadata of the file and attaching the augmented reality environment information to an end of the file in response to the file storage type is JPEG format;

wherein performing the augmented reality processing on the target picture comprises:

in response to the instruction for performing augmented reality on the target picture, obtaining the length of the augmented reality environment information from the XMP metadata, obtaining the augmented reality environment information by determining a starting point for the augmented reality environment information based on the length and an end position of the file, and performing the augmented reality processing using the augmented reality environment information.

12. The non-transitory computer-readable storage medium of claim 11, wherein the augmented reality environment information comprises:

one or more of plane information, light source information, and environment depth information of an image capturing scene.

13. The non-transitory computer-readable storage medium of claim 11, wherein the image capturing instruction is an instruction for capturing a video; and capturing the image and recording the augmented reality environment information corresponding to the image, to obtain the target image carrying the augmented reality environment information comprises:
when capturing the video, sequentially recording the augmented reality environment information corresponding to each video frame of the shot video using an augmented reality algorithm; and
according to a display timestamp of each video frame, associating each video frame of the shot video with the augmented reality environment information corresponding to each video frame, to obtain a target video carrying the augmented reality environment information.

14. The non-transitory computer-readable storage medium of claim 13, wherein the method further comprises:
according to a file storage type of the target video, packaging the augmented reality environment information of the target video into a file of the target video to obtain a target video file carrying the augmented reality environment information; and
in response to receiving an instruction for performing augmented reality on the target video file, performing an augmented reality processing on the target video file according to the augmented reality environment information of the target video file.

* * * * *